Patented Jan. 11, 1949

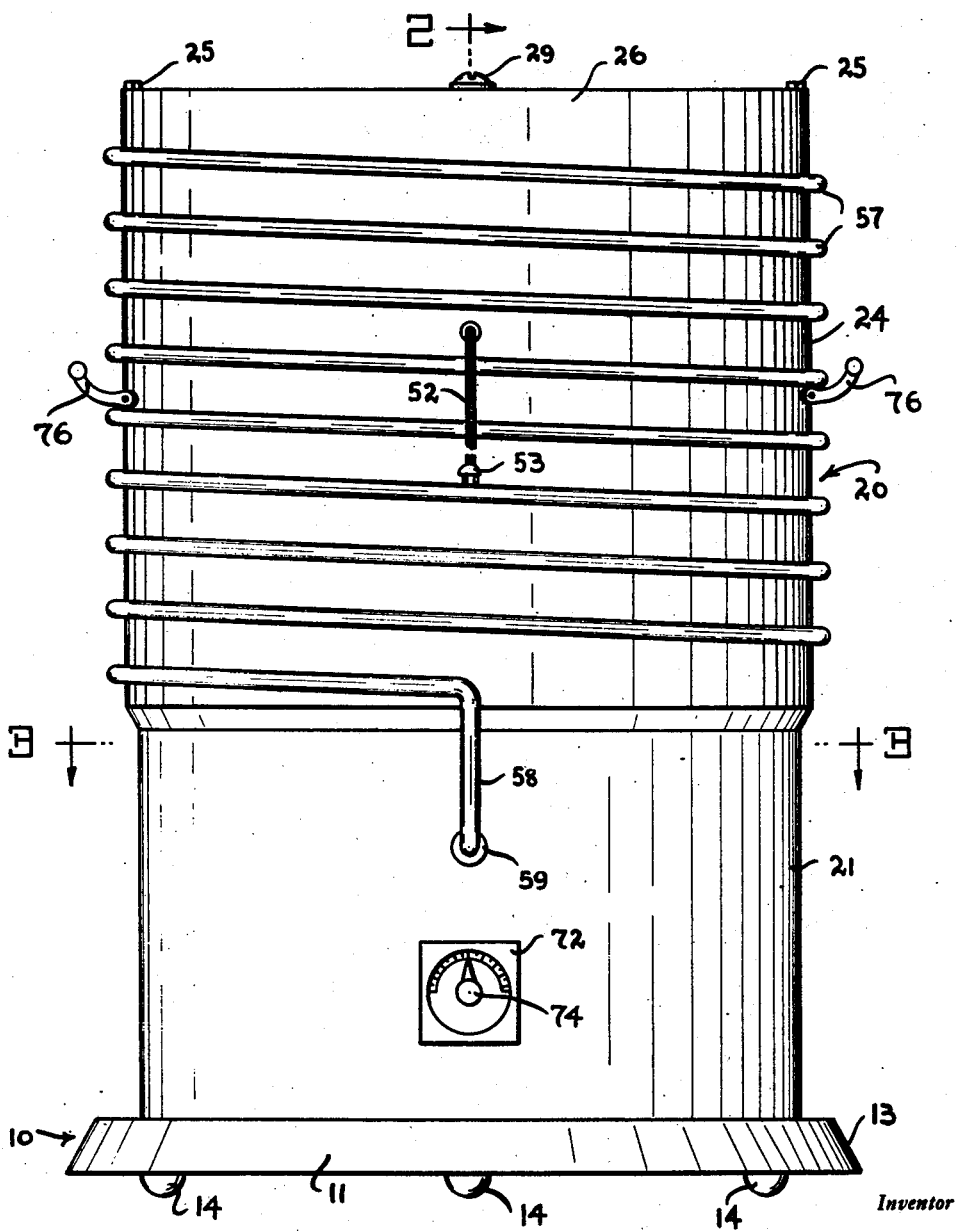

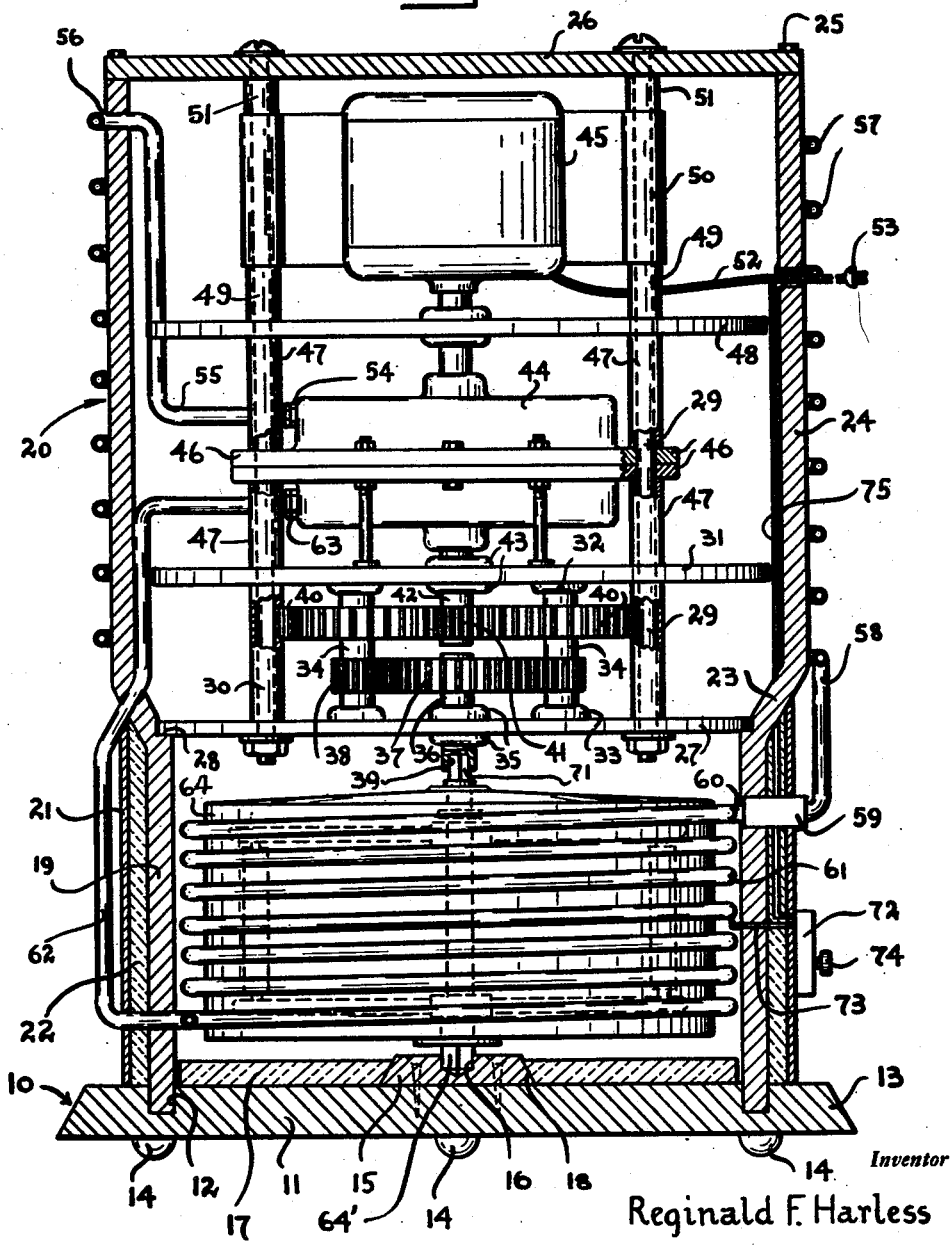

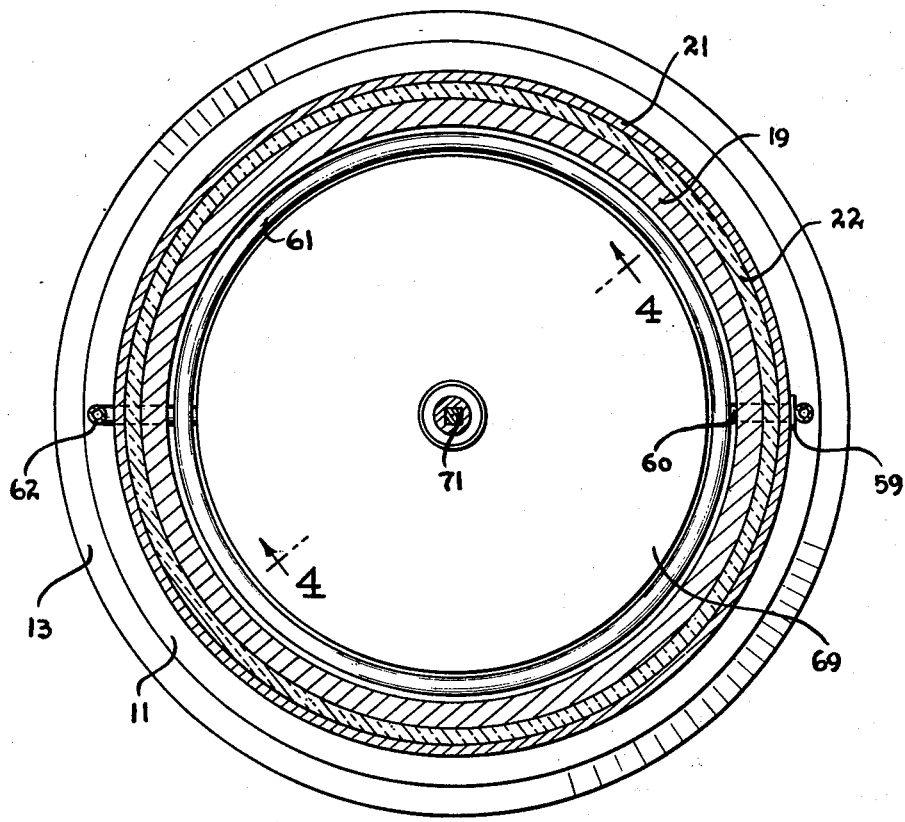
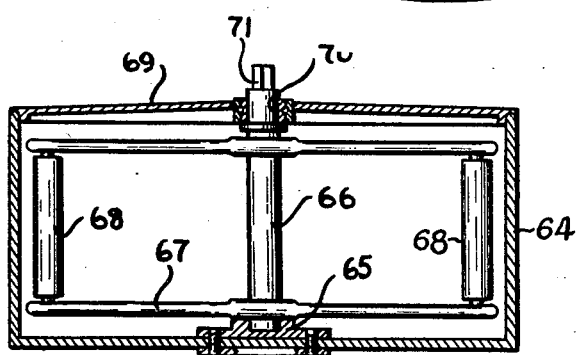

2,458,940

UNITED STATES PATENT OFFICE 2,458,940

REFRIGERATING DEVICE FOR THE MANUFACTURE OF FROZEN COMESTIBLES

Reginald F. Harless, Ossining, N. Y.

Application June 16, 1945, Serial No. 600,153

5 Claims. (Cl. 62—114)

1

This invention relates to refrigerating devices and more particularly to an automatic freezing unit for the manufacture of ice cream, frozen custards, mousse and the like.

The primary object of the invention is a compact unit of high efficiency susceptible of production in various sizes to suit the requirements of a small family or the production requirements of a manufacturer operating on a commercial scale.

The above and other objects may be attained by employing this invention which embodies among its features a heat insulated housing comprising a base and a bonnet which latter is separable from the base and serves to enclose the refrigerating equipment and the substance to be refrigerated while the base not only serves as a support for the bonnet but also provides for accurate location of the container for the substance to be refrigerated.

In the drawings:

Figure 1 is a side view in elevation of a refrigerating device embodying my invention.

Figure 2 is a vertical sectional view taken on the line 2—2 of Figure 1.

Figure 3 is a horizontal sectional view taken on the line 3—3 of Figure 1, and

Figure 4 is a vertical sectional view taken on the line 4—4 of Figure 3.

Referring to the drawings in detail a base designated 10 comprising a circular disk 11 serves as the support for the entire device. The disk 11 is provided in its upper surface with an annular groove 12 and its outer edge is beveled as at 13. The underside of the disk 11 is provided with feet 14 and secured to the upper side of the disk is a bearing plate 15 having an internally rectangular socket 16 situated at the axis of the disk. Resting on the upper face of the disk 11 is a pad 17 of insulating material which is pierced as at 18 to accommodate the plate 15 and is of slightly less diameter than the innermost wall of the annular groove 12 as will be seen upon reference to Figure 2.

Seated in the bottom of the groove 12 is a cylindrical supporting and housing member 19 forming a part of the bonnet designated generally 20. This cylindrical part 19 is surrounded by a spaced jacket 21 and the space between the jacket and the body 19 is filled with suitable insulating material 22. Superposed upon the body 19 and connected thereto by a frusto-conical wall 23 is a cylindrical wall 24 forming a housing for the mechanical features of the refrigerator as will be more fully hereinafter described. Secured

2 to the upper end of the cylindrical portion 24 by means of bolts 25 is a cover plate 26 which cooperates with a closure plate 27 at the lower end of the frusto-conical part 23 in sustaning the mechanical parts of the device in place. As shown in Figure 2, the plate 27 rests upon a shoulder 28 formed at the junction of the frusto-conical part with the body 19 and thus helps to support the mechanical elements of the refrigerator.

Extending through the cover plate 26 and through aligning openings in the plate 27 are tie bolts 29 upon which the mechanical parts of the refrigerator are mounted. Supported on spacers 30 extending upwardly from the plate 27 and surrounding the tie bolts 29 is a gear supporting plate 31 carrying bearings 32 which align with bearings 33 carried by the plate 27 and support pinion shafts 34. Mounted for rotation in bearings 35 arranged centrally of the plate 28 is a shaft 36 carrying a gear 37 which meshes with pinions 38 carried by the shafts 34. The lower end of the shaft 36 protrudes beyond the end of the lowermost bearing 35 and is formed with an internal rectangular socket 39 for a purpose to be more fully hereinafter described. Mounted on the shafts 34 adjacent the pinions 38 are gears 40 which mesh with a pinion 41 carried by a drive shaft 42 which is mounted for rotation centrally of the plate 31 in bearings 43. As shown in Figure 2 this drive shaft extends upwardly through a pump casing 44 to a motor 45 mounted in the upper end of the bonnet 20 as will be more fully hereinafter explained.

As shown in Figure 2 the pump casing is provided with relatively wide portions 46 on its junction flanges which portions are pierced to receive the bolts 29 and the pump is supported in proper spaced relation on the bolts by means of spacers 47. It is, of course, understood that the impeller of the pump is housed within the pump casing 44 and connected to the shaft 42 to be driven by the motor 45.

Seated on the upper ends of the uppermost spacers 47 is a plate 48 which like the plates 27 and 31 is pierced to receive the bolts 29. Resting on the upper surface of the plate 48 and surrounding the bolts are spacers 49 which, in turn, support the sleeves 50 carried by the motor frame 45. Similar spacers 51 surround the bolts 29 and extend between the underside of the cover plate 26 and the upper edges of the sleeves 50 in order to rigidly hold the various parts together as a unit.

Connected to the motor 45 and extending through an opening in the side of the casing 24 is a cord 52 carrying electrical conductors which are operatively connected at one end to the motor terminals and at their opposite ends to the contacts of a connection plug 53.

Leading from the discharge coupling 54 of the compressor or pump 44 is a pipe 55 which turns upwardly and passes through the wall 24 at 56 to the outside of the bonnet. This pipe is coiled around the outside in a series of annular convolutions 57 from the top to the bottom of the casing 24 and that the bottom is bent downwardly as at 58 and turned inwardly to connect with an expansion valve 59. This expansion valve 59 is mounted in the wall 19 near its upper end and is connected by a pipe 60 with a coil 61 the convolutions of which lie within the wall 19 and form a hollow bottomless refrigerated chamber in which the material to be refrigerated is contained. The opposite end of the coil is connected by means of a pipe 62 to the intake side 63 of the pump or compressor 44 and hence it will be seen that a completely closed circuit for the refrigerating gas is thus produced.

From the foregoing it will be seen that a complete refrigerator capable of cooling and actually freezing liquid is thus produced and all that is necessary is that the material to be refrigerated be placed within a container within the chamber formed by the coil 61.

When the device is to be used for freezing ice cream and the like a container 64 constituting a cylindrical body having a closed bottom and an open top is mounted on the plate 15 by introducing into the socket 16 a rectangular pin 64' carried by the closed bottom of the container 64. This serves accurately to locate the container 64 within the freezing chamber defined by the coil 61 when the housing member 17 is placed on the base 10 with its lower edge entering the groove 12. Mounted for rotation in a bearing plate 65 within the container 64 is the lower end of a shaft 66 to which are welded or otherwise secured arms 67 carrying at their extremities paddles 68 which rotate within but near the cylindrical side wall of the container 63 and thus form an agitator for the contents of the container. A cover 69 is fitted to the upper open end of the container 64 as illustrated in Figure 4 and is provided with a central aperture 70 for the reception of the upper end of the shaft 66. Extending upwardly from the upper end of the shaft 66 beyond the cover 70 is a rectangular extension 71 which when the parts are assembled is received in the socket 39 formed at the lower end of the shaft 36. It will thus be seen that with the container 64 and its respective agitator in place on the base plate 10 and with the bonnet 10 and its attendant mechanism seated in position on said base plate the refrigerating equipment will be set in motion when the motor 45 is connected to a power source and the agitator within the container 64 will be driven.

It is to be understood that when so desired a thermostatic control 72 may be connected to the cylindrical casing 19 with the thermostatic element 73 arranged adjacent the freezing coils 61 and that the temperature may be regulated by means of an adjusting knob 74 so that contact can be established between wires 75 leading to the power supply cord 52 and that by this method the motor may be stopped when the temperature of the freezing coils attains a certain point and again started when the temperature again rises beyond that point.

While each individual unit of the device herein described is recognized as being of standard construction, it is to be understood that I make no claim to the units as individual parts but that I do consider that the particular arrangement and distribution of the elements produces a new and compact structure capable of practical use both in the home and in the commercial production of frozen delicacies.

In use the bonnet 20 is removed from the base 10 thus exposing the container 64. The cover 69 is then removed thus gaining access to the interior of the container. The shaft 66 with the paddles 68 is then lifted out of the socket plate 65 and the substance to be frozen is placed in the container. Upon replacing the shaft and the paddles, the cover 69 is again placed on the container 64 with the squared end 71 of the shaft protruding through the opening 70 of the cover 69. The filled and covered container is then seated on the base 10 with the stud 64' entering the socket 16 in the plate 15 to hold the container 64 against rotation. The bonnet 20 is then replaced on the base 10 with its lower edge entering the groove 12. In this position of the bonnet, the squared end 71 of the shaft 66 will enter the socket 39 in the lower end of the shaft 36 so that when the motor 45 is set into operation, the shaft 66 will be rotated through the medium of the pump 44 and speed reduction gearing.

Obviously, articles may be chilled simply by placing them on the base 10 and seating the bonnet 20 thereover as above described so that the articles are confined within the chamber defined by the coil 61 and setting the motor 45 into operation. When so used, the container 64 and shaft 66 are omitted.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

1. A freezing unit comprising a housing of substantially cylindrical form, a base having a groove to receive the lower end of the housing, a motor, a compressor, and a speed reduction gearing driven by the shaft of the compressor, said motor, compressor and speed reduction gearing being mounted in the upper end of the housing, a food container adapted to be centered on the base and enclosed within the lower end of the housing, an agitator rotatably mounted within the container and adapted to be loosely connected with the speed reduction gearing to be driven thereby, cooling coils surrounding the exterior of the housing and connected with the discharge end of the compressor, freezing coils on the interior of the housing and surrounding the food container, said freezing coils being connected with the intake side of the compressor, a pipe connecting the cooling coils and the freezing coils and an expansion valve in said pipe.

2. A refrigerating unit comprising a substantially cylindrical housing enclosing a motor, a compressor adapted to be driven by the motor shaft, and a speed reduction gearing driven by the compressor shaft, a substantially cylindrical housing of reduced diameter, a frusto-conical portion connecting the housings, insulating material surrounding the exterior of the housing of reduced diameter, a base having an annular groove adapted to receive the lower end of the housing of reduced diameter, a food container centered on the base, said food container containing an agitator, a separable driving connection between the agitator and the speed reduction gearing whereby when the motor is driven the agitator will likewise be driven, a cooling coil surrounding the larger cylindrical portion of the housing and a freezing coil within the housing of reduced diameter.

3. In a portable refrigerating unit a prime mover, a refrigerant compressor mounted in vertical alignment with and arranged to be driven by the prime mover, a speed reduction gear train mounted in vertical alignment with and arranged to be driven by the compressor, a freezing coil beneath the gear train and connected with the compressor and said freezing coil defining an open bottomed freezing chamber which aligns vertically with the gear train whereby the unit may be placed over an article to be refrigerated, a container for liquid adapted to be introduced into the freezing chamber, an agitator removably mounted in the container and a separable coupling arranged to establish driving connection between the gear train and the agitator.

4. In a portable refrigerating unit an elongated hollow substantially cylindrical housing wholly open at its bottom, a prime mover within the housing near its top, a refrigerant compressor within the housing beneath and in vertical alignment with the prime mover, said compressor having driving connection with the prime mover, a speed reducing gear train within the housing beneath the compressor, said gear train aligning vertically with and being driven by the compressor, a freezing coil within the housing beneath the gear train and said freezing coil defining a freezing chamber adjacent the bottom open end of the housing which aligns vertically with the gear train, a base for supporting the housing and closing the bottom end of the freezing chamber, a vessel adapted to rest on the base within the freezing chamber, an agitator mounted in the vessel for rotation about a vertical axis and means to establish driving connection between the gear train and the agitator when the housing is in place on the base.

5. In a portable refrigerating unit an elongated hollow substantially cylindrical housing wholly open at its bottom, a prime mover within the housing near its top, a refrigerant compressor within the housing beneath and in vertical alignment with the prime mover, said compressor having driving connection with the prime mover, a speed reducing gear train within the housing beneath the compressor, said gear train aligning vertically with and being driven by the compressor, a freezing coil within the housing beneath the gear train, said freezing coil defining a freezing chamber adjacent the bottom open end of the housing which aligns vertically with the gear train, a base for supporting the housing and closing the bottom end of the freezing chamber, a vessel adapted to rest on the base within the freezing chamber, an agitator mounted in the vessel for rotation about a vertical axis, means to establish driving connection between the gear train and the agitator when the housing is in place on the base, and means carried by the base for so locating the housing as to align the agitator with the power delivery shaft of the gear train.

REGINALD F. HARLESS.

REFERENCES CITED

The following references are of record in the file of this patent:

UNITED STATES PATENTS

| Number | Name | Date |
|---|---|---|
| 1,669,141 | Orr | May 8, 1928 |
| 1,898,724 | Gifford | Feb. 21, 1933 |
| 1,916,746 | Swisher | July 4, 1933 |
| 2,001,540 | Newman | May 14, 1935 |
| 2,333,975 | Epperson | Mar. 4, 1941 |